(12) United States Patent
Mallary

(10) Patent No.: US 6,430,123 B1
(45) Date of Patent: Aug. 6, 2002

(54) SCANNING MICROPATTERNS ON AN OPTICAL MEDIUM

(75) Inventor: Michael Mallary, Berlin, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/437,697

(22) Filed: Nov. 10, 1999

(51) Int. Cl.[7] .............................................. G11B 7/100
(52) U.S. Cl. ................................ 369/44.11; 369/44.26; 369/111; 369/275.4
(58) Field of Search .......................... 369/272, 275.4, 369/276, 277, 278, 279, 280, 284, 44.11, 44.26, 44.13, 275.3, 103, 111, 109; 360/78.06, 78.08, 77.03; 264/1.31, 1.33, 1.34, 1.37; 359/3, 22, 25

(56) References Cited

U.S. PATENT DOCUMENTS

| | | | | |
|---|---|---|---|---|
| 4,486,870 A | * | 12/1984 | Pettigrew et al. | 369/111 |
| 4,880,496 A | * | 11/1989 | Nebenzahl | 156/643 |
| 5,007,690 A | * | 4/1991 | Chern et al. | 369/103 |
| 5,390,157 A | * | 2/1995 | Revelli, Jr. | 369/44.12 |
| 5,400,319 A | * | 3/1995 | Fite et al. | 369/275.5 |
| 5,418,773 A | * | 5/1995 | Bakx et al. | 369/275.1 |
| 5,477,347 A | * | 12/1995 | Redfield et al. | 369/103 |
| 5,511,035 A | * | 4/1996 | Russell | 250/216 |
| 5,614,338 A | * | 3/1997 | Pyburn et al. | 430/13 |
| 5,703,858 A | * | 12/1997 | Mitchell et al. | 369/58 |
| 5,717,682 A | * | 2/1998 | Nomoto | 369/275.4 |
| 5,741,628 A | * | 4/1998 | Matso et al. | 430/323 |
| 5,835,404 A | * | 11/1998 | Heller et al. | 365/151 |
| 5,848,050 A | * | 12/1998 | Nagasawa et al. | 369/275.4 |
| 5,859,830 A | * | 1/1999 | Eastman et al. | 369/109 |
| 5,901,010 A | * | 5/1999 | Glover et al. | 360/78.12 |
| 5,948,684 A | * | 9/1999 | Weigl et al. | 436/52 |
| 6,028,620 A | * | 2/2000 | Yin | 347/252 |
| 6,074,513 A | * | 6/2000 | Shimizu | 156/345 |
| 6,091,700 A | * | 7/2000 | Kobayashi | 369/275.4 |
| 6,104,686 A | * | 8/2000 | Whitcher et al. | 369/111 |
| 6,139,713 A | * | 10/2000 | Masuda et al. | 205/206 |
| 6,151,281 A | * | 11/2000 | Van Der Enden et al. | 369/47 |
| 6,198,718 B1 | * | 3/2001 | Watanabe | 369/291 |
| 6,201,773 B1 | * | 3/2001 | Aoki | 369/44.13 |
| 6,208,614 B1 | * | 3/2001 | Kim | 369/275.4 |
| 6,215,758 B1 | * | 4/2001 | Horimai et al. | 369/275.3 |
| 6,229,661 B1 | * | 5/2001 | Abe | 360/53 |
| 6,252,845 B1 | * | 6/2001 | Hino et al. | 369/275.3 |
| 6,256,282 B1 | * | 7/2001 | Yamagami et al. | 369/111 |
| 6,259,575 B1 | * | 7/2001 | Thomas, III et al. | 360/60 |
| 6,269,071 B1 | * | 7/2001 | Van Den Enden et al. | 369/275.4 |

FOREIGN PATENT DOCUMENTS

EP 0651377 A1 * 5/1995

OTHER PUBLICATIONS

Haddon et al, "The molecular electronic device and the biochip computer: Present status", Proceedings of the national academy of sciences, USA, vol. 82, pp. 1874–1878, Nov. 1984.*

Halfhill,"New Memory Architectures to Boost Performance", Byte, pp. 86–87, Jul. 1993.*

Cardullo et al, "Detection of nucleic acid hybridization by nonradiative fluorescence resonance energy transfer", Proceedings of the national academy of sciences, USA, vol. 85, pp. 8790–8794, Dec. 1988.*

Morita et al., "Deep–Groove and Low–Noise Mastering," Optical Data Storage Technical Digest, Series vol. 8, May 10, 1998, pp. 55–57.

* cited by examiner

Primary Examiner—Thang V. Tran
(74) Attorney, Agent, or Firm—David M. Sigmond

(57) ABSTRACT

An optical positioning circuit includes an electro-optic positioner which positions an optical beam on an optical medium to read/write patterns of data on the optical medium, and a driver circuit, such as an inductive capacitive circuit, which drives the electro-optic positioner. The optical medium has a dimension along which the optical medium is moved, and each of the micropatterns extends along less than (e.g., ⅒th of) that dimension.

38 Claims, 5 Drawing Sheets low A, hi f ⟶ hi A, low f

SCANNING MICROPATTERNS ON AN OPTICAL MEDIUM

BACKGROUND OF THE INVENTION

This invention relates to scanning micropatterns on an optical medium.

Optical media, such as a CDs ("Compact Disks"), include data in a pattern (such as a spiral) that is roughly two to five inches in diameter. In digital linear tape ("DLT") systems, long parallel tracks are conventionally formed on the media. Patterns of this size are fairly susceptible to optical scanning errors. For example, deviations in an optical beam caused, e.g., by a sudden jolt to the medium, can result in relatively significant scanning errors, particularly if the optical beam remains off track for a long period of time.

Land and groove patterns, which are used to keep the optical beam on track, can have an adverse affect on reading and writing data on the optical medium. For example, ragged edges on the land and grooves can contribute to noise in the data. Moreover, including land and groove patterns on the media complicates the optical medium manufacturing process.

SUMMARY OF THE INVENTION

In general, in one aspect, the invention features an optical medium that includes a micropattern of data. The optical medium has a dimension along which the optical medium is moved, and the micropattern extends along less than this dimension. Formatting data in a micropattern of this size can reduce scanning errors.

More specifically, the time it takes to scan a micropattern is less than the time it takes to scan a regular spiral (since the micropattern extends along less than the dimension of movement of the optical medium). As a result, scanning errors can be substantially confined to the micropattern, without propagating through the rest of the optical medium. Even in cases where jolts or other unwanted accelerations occur to the medium, resulting scanning errors are less severe, since the time over which the jolts or accelerations have an effect is substantially limited to the scanning time of the micropattern.

The micropattern may be formed on an area of the optical medium that does not include land and groove patterns. As a result, noise in the data resulting from the land and groove patterns can be eliminated, and the optical medium can be manufactured with less time and expense.

The foregoing aspect may also include one or more of the following features/functions. The optical medium may include plural micropatterns of data. The plural micropatterns may be arranged in a hexagonal grid pattern. A guard zone may be located between the micropattern and another micropattern on the optical medium. The guard zone comprises an area of the optical medium which does not include data. The guard zone may be 20% or less of the total area of the optical medium.

The micropattern may comprise a microspiral that can be traced from its inner diameter to its outer diameter without leaving the surface of the optical medium. Alternatively, the micropattern may comprise substantially concentric shapes, such as circles. The micropattern may be less than 2 mils in diameter and/or less than $4/10^6$ in$^2$ in area. The optical medium may comprise one of a CD-ROM, digital linear tape, and a card storage medium.

In general, in another aspect, the invention features an optical positioning circuit that includes an electro-optic positioner which scans an optical beam along an optical medium for reading or writing a pattern of data on the optical medium. A driver circuit, such as an inductive-capacitive circuit, drives the electro-optic positioner. Using an electro-optic positioner reduces the need for mechanical devices to position the optical beam on the optical medium, thereby reducing positioning errors associated with such devices.

This aspect of the invention may include one or more of the following features/functions. The electro-optic positioner may comprise a capacitor having a dielectric which deflects light based on an applied voltage signal. The driver circuit may comprise an inductive-capacitive circuit, including an inductive winding of a transformer and one or more capacitors, that operates in a resonant mode to deliver voltage signals to the electro-optic positioner. Operating the inductive-capacitive circuit in resonant mode reduces the input power of the signals needed to drive the electro-optic positioner.

The driver circuit produces the voltage signal that drives the electro-optic positioner. The voltage signal has a substantially sinusoidal waveform with a progressively increasing amplitude and decreasing frequency. Higher frequency portions of the voltage signal control scanning inner diameter portions of the pattern and lower frequency portions of the voltage signal control scanning outer diameter portions of the pattern. A control circuit provides a control signal that causes the electro-optic positioner to position the optical beam at a location to begin forming a new pattern, such as its center.

In general, in another aspect, the invention features a method of scanning a micropattern on an optical medium. The micropattern extends along less than a dimension along which the optical medium is moved. The method includes positioning an optical beam at a location on the optical medium relative to the micropattern, and scanning the micropattern with the optical beam in accordance with a voltage signal.

Other advantages and features will become apparent from the following description and the claims.

DESCRIPTION OF THE PREFERRED EMBODIMENTS

Figure 1:
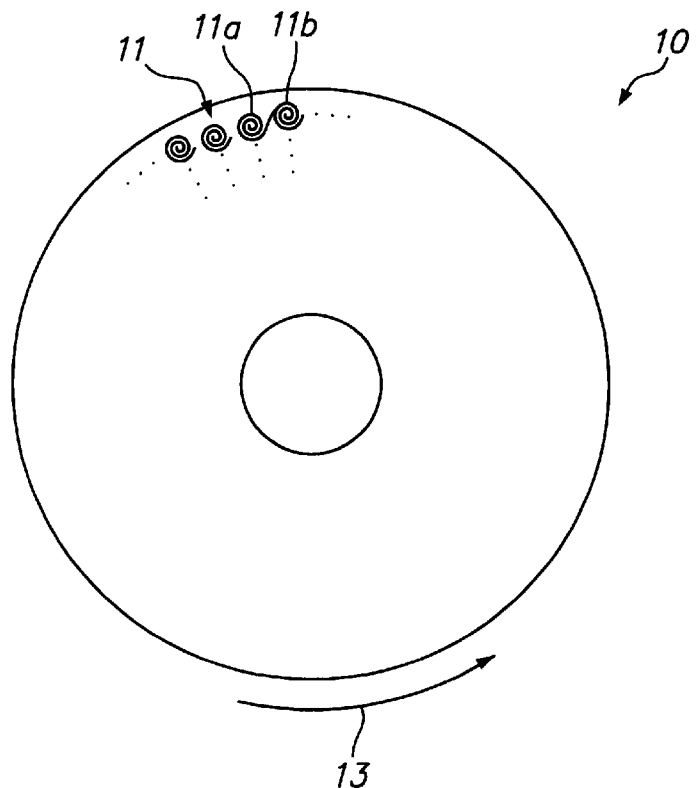
FIG. 1 is a view of a optical medium with data micropatterns.

FIG. 1 shows an optical medium 10 which includes data formatted in micropatterns. Optical medium 10 is a writable CD; however, other types of optical media may be used, such as digital linear tape or card storage devices. Data is stored on optical medium 10 and read therefrom using an optical beam, such as a laser.

The data on optical medium 10 is formed in one or more micropatterns 11. What is meant by "micropattern" is a data pattern that extends over less than (e.g., 1/10th of) a movement dimension of the optical medium. For example, optical medium 10 rotates along the direction of arrow 13, which makes its movement dimension its circumference. Therefore, a micropattern on optical medium 10 is any pattern that extends over less than a circumference of optical medium 10. For example, a micropattern may be a microspiral having a circumference that is 1/10th the circumference of the innermost track on the medium.

Micropatterns 11 on optical medium 10 each have a diameter of between one and two mils. Generally, micropatterns have areas of less than 10×10 mils square; however, there are no absolute constraints on the size of micropatterns. Smaller micropatterns, however, can reduce scanning errors more effectively than larger micropatterns.

Figure 2:
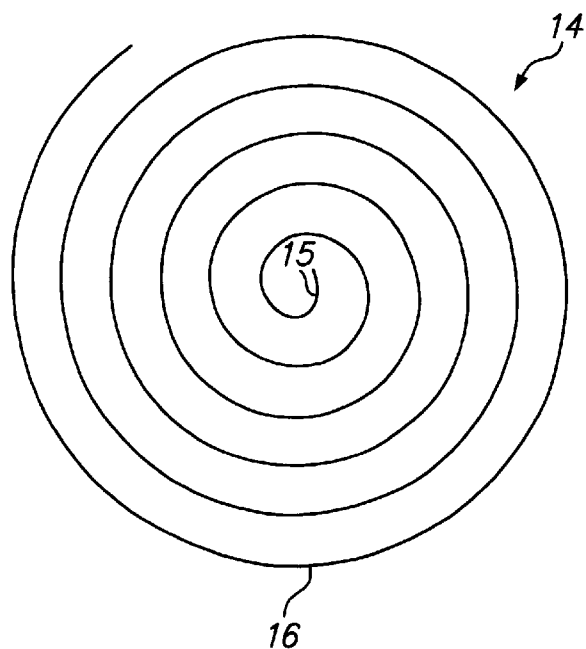
FIGS. 2, 3, 4 and 5 are views of different types of individual micropatterns.
Figure 3:
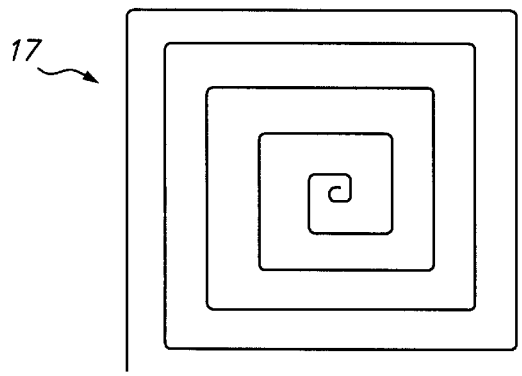
Figure 4:
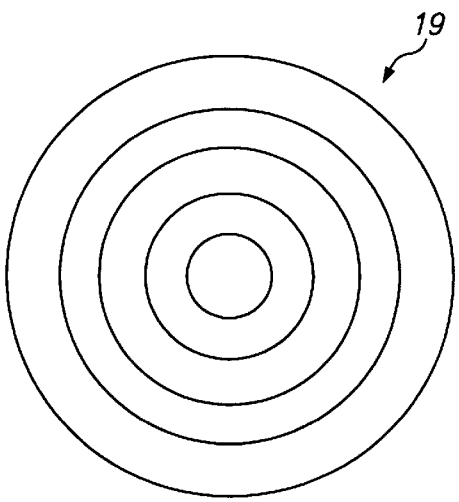
Figure 5:
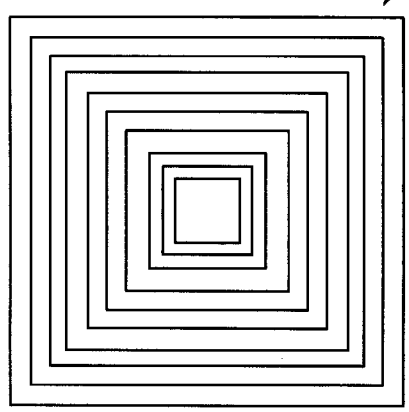

Micropatterns can have any shape; though circular shapes can be formed using a relatively simple driver circuit. For example, a micropattern may be a circular microspiral 14 (FIG. 2), a rectangular microspiral 17 (FIG. 3), or any other type of microspiral. Micropatterns may also be concentric shapes, such as circles 19 (FIG. 4) or rectangles 20 (FIG. 5).

Furthermore, micropatterns may have inner and outer diameter portions. For instance, circular microspiral 14 includes inner diameter portion 15 and outer diameter portion 16.

All micropatterns on an optical medium may have the same basic shape, or the optical medium may include combinations of differently-shaped micropatterns. For example, the same optical medium may contain circular microspiral 14 of FIG. 2 and rectangles 20 of FIG. 5. The individual micropatterns may be discrete or portions thereof may be connected. For example, in FIG. 1, individual micropatterns 11a and 11b are connected.

Micropatterns may be formed on areas of an optical medium that do not contain land and groove patterns. Since the micropatterns are of such a small size, land and groove patterns are not generally needed to keep an optical beam on track. However, micropatterns may also be formed on an optical medium that contains land and groove patterns.

Figure 6:
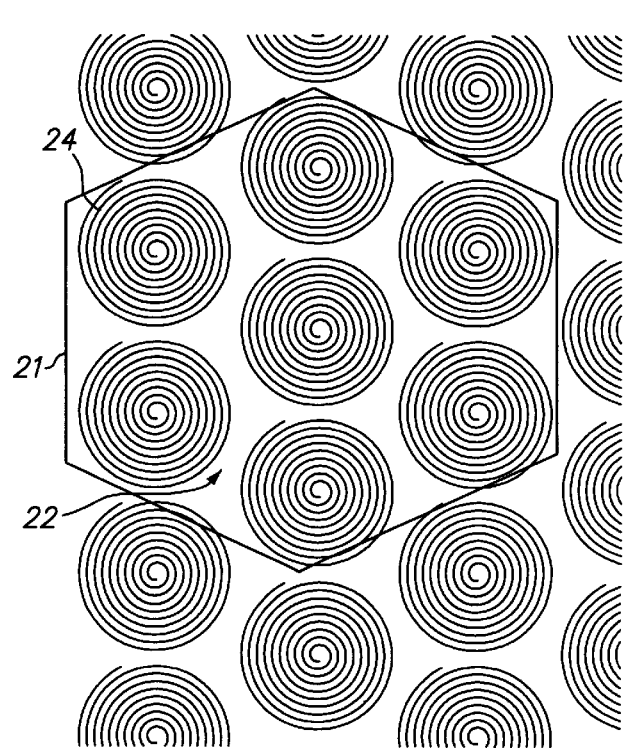
FIG. 6 is a view of a hexagonal grid pattern of micropatterns stored on an optical medium.

Circular micropatterns may be formed in a hexagonal grid pattern, such as pattern 21 of FIG. 6. This hexagonal grid pattern enables the micropatterns to be packed relatively close together, thereby reducing the amount of unused space 22 on the optical medium. Unused space 22 does not include data, and can comprise a guard zone (in which data cannot be written) which ensures separation of micropatterns 24. Using a hexagonal grid pattern, unused space 22, including any guard zones, can be reduced to 20% or less of the total area of an optical medium.

Figure 7:
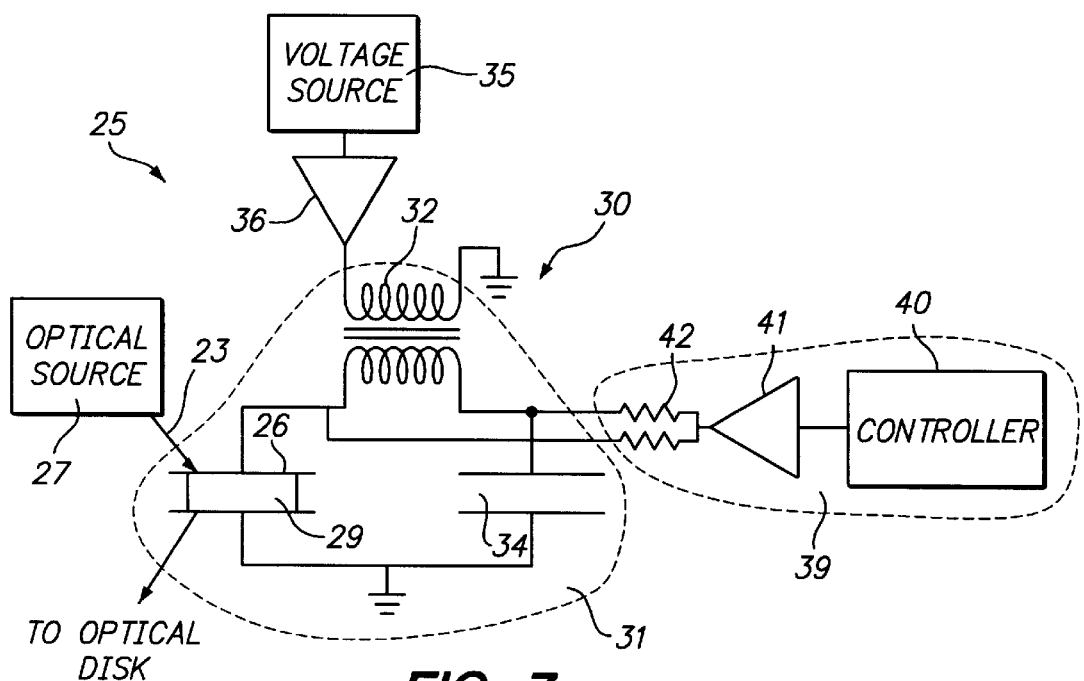
FIG. 7 is a circuit diagram showing an optical positioning circuit for scanning an optical medium.

FIG. 7 shows an optical positioning circuit 25 for controlling scanning of an optical beam to read and write data in micropatterns on an optical medium. While circuit 25 will be described in the context of scanning micropatterns, it is noted that circuit 25 can be used to scan any type of data pattern, not just micropatterns. Circuit 25 includes an x-y electro-optic positioner 26, which positions an optical beam 23 on an optical medium to form micropatterns on the optical medium and to read data in those micropatterns from the optical medium. In this embodiment, the optical beam 23 is a blue laser (440 nanometer (nm) wavelength) that is provided from an optical source 27.

Electro-optic positioner 26 is a capacitor (of about 50 picofarads (pF)) having a dielectric 29 that deflects light based on an applied voltage signal. For example, dielectric 29 may be a prism having an index of refraction that varies in accordance with the applied voltage signal. Changes in the prism's index of refraction cause directional changes in the optical beam passing through the prism. Depending upon the construction of electro-optic positioner 26, directional changes in the optical beam can be effected in the megahertz (MHz) range (meaning millions of changes per second).

Electro-optic positioners such as that described above can require an applied voltage on the order of 1 kilovolt (kV) to effect a 10 change in the direction of optical beam 23. A driver circuit 30, however, can be used which enables electro-optic positioner 26 to run off of a power supply that provides less than 1 kV.

Driver circuit 30 includes an inductive-capacitive (LC) circuit 31 comprised of a transformer 32 and a pedestal capacitor 34 (150 pF). Voltage is applied to electro-optic positioner 26 through transformer 32. LC circuit 31 is operated in resonant mode (the inductance of transformer 32 is tuned to resonance), which helps to keep initial voltage signals circulating in LC circuit 31 absent additional applied voltage. As a result, the amount of additional voltage that must be applied to LC circuit 31 to achieve 1 kV (or more) at electro-optic positioner 26 is decreased. The amount of this decrease in voltage depends on the capacitance of capacitor 34 and electro-optic positioner 26, the inductance of transformer 32, and parasitic resistance in the circuit. For example, by selecting appropriate values for these components, a 100 V input to LC circuit 31 can be used to obtain 1 kV, or more, voltages at electro-optic positioner 26. Other voltage inputs can be obtained, as required, depending upon the voltage requirements of electro-optic positioner 26.

Figure 8:
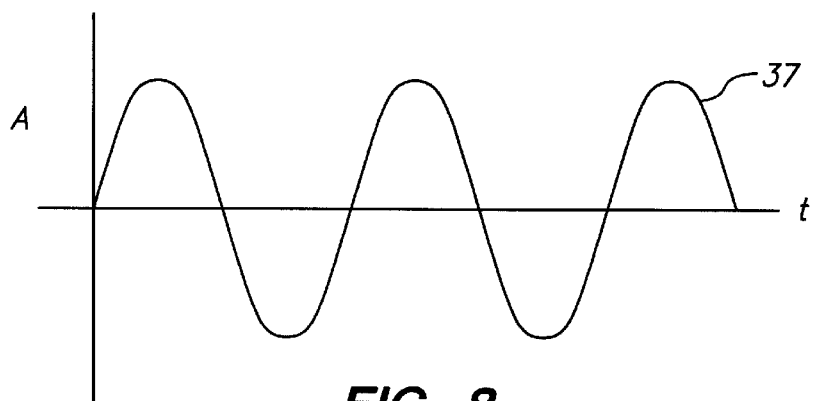
FIG. 8 shows a voltage signal that controls scanning of data patterns in the circuit of FIG. 7 in a resonant mode.

Voltage is applied to LC circuit 31 from voltage source 35 (via amplifier 36). The voltage signal used to produce microspirals (FIG. 2) has a sinusoidal waveform defined by $x = A(t) \sin \omega t$ $y = A(t) \cos \omega t,$ where $\omega$ is angular frequency, t is time, and A(t) is amplitude as a function of time. An example of such a waveform 37 is shown in FIG. 8.

Also included in optical positioning circuit 30 is a control circuit 39, comprised of controller 40, amplifier 41, and resistors 42. Control circuit 39 provides a control signal which causes electro-optic positioner 26 to position the optical beam at a location on the optical medium to form a new micropattern. This location corresponds, for example, to a center of a new micropattern.

Figure 9:
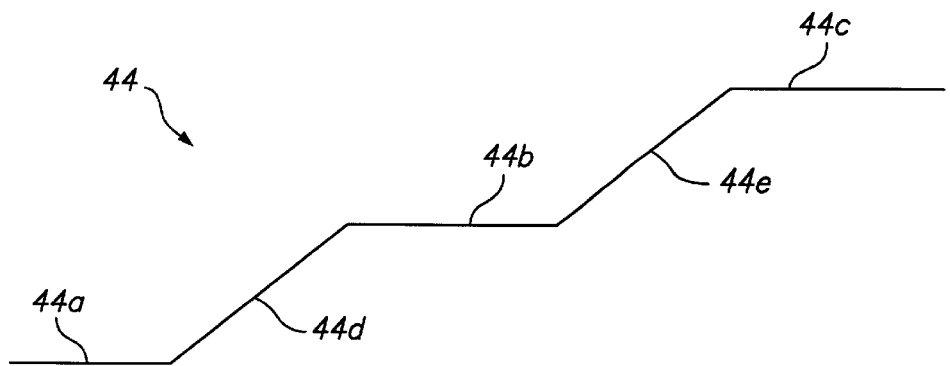
FIG. 9 shows a control signal for positioning an optical beam at a location for. scanning a micropattern.

The control signal may be a voltage step function or the like, such as signal 44 in FIG. 9. During the constant phases 44a, 44b and 4c of control signal 44, voltage signal 37 (FIG. 8) controls the positioning of the optical beam to form a current micropattern (in this case, a microspiral). During the ramp-up phases 44d and 44e, control signal 44 causes electro-optic positioner 26 to move to a location on the optical medium at which a new micropattern is to be formed. The location may be determined based on pre-stored information relating to the geometry of the optical medium. Alternatively, the location may be determined based on "center locator" patterns or data added to the disk during manufacture and detected via the optical beam.

Figure 10:
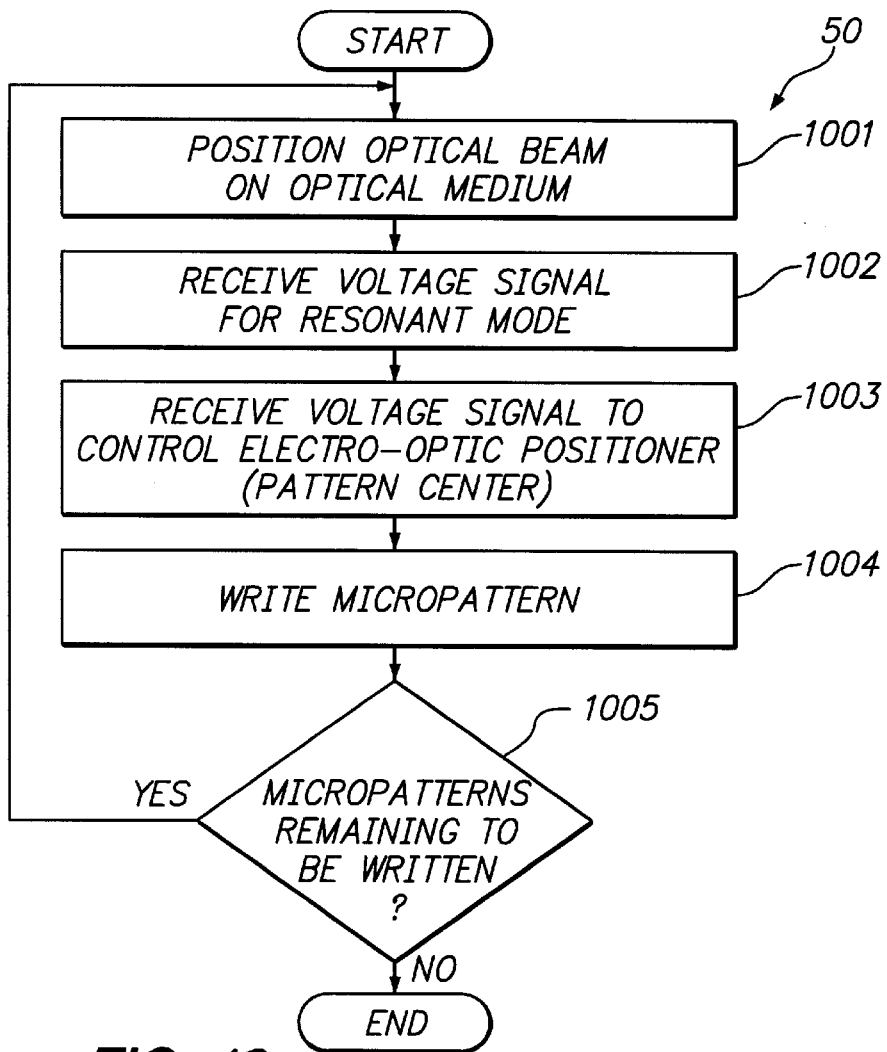
FIG. 10 is a flow diagram showing a process for scanning a micropattern.
Figure 11:
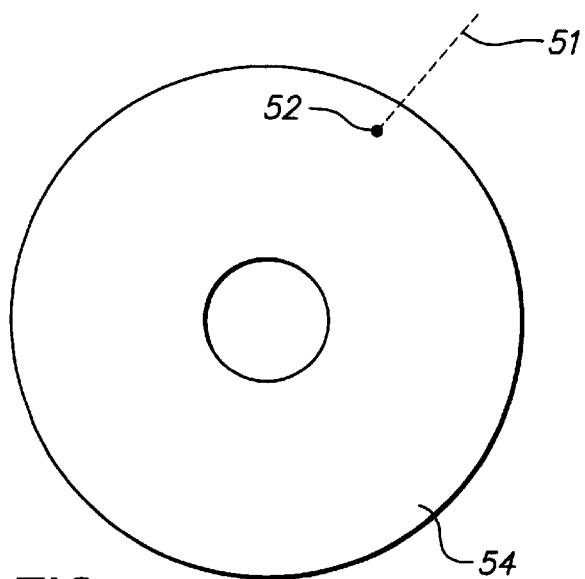
FIG. 11 is a perspective view of an optical beam positioned on an optical medium for scanning a micropattern.

FIG. 10 shows a process 50 for writing micropatterns of data onto an optical medium. Process 50 begins by positioning (1001) an optical beam 51 on a position 52 on optical medium 54 where a micropattern is to be formed (see FIG. 11). This position is typically the center of the new micropattern. This may be done via electro-optic positioner 26 in accordance with control signal 44 (FIG. 9). A mechanical positioning device may be used in addition to (or even instead on electro-optic positioner 26 in 1001. If medium 54 is continuously rotating, then regions 44a, 44b and 44c of control signal 44 should be slightly sloped on the circumferential axis to compensate for the circumferential velocity of the spiral center on the disk.

In 1002, LC circuit 31 receives a voltage signal from voltage source 35, which brings LC circuit 31 into resonance. While LC circuit 31 is in resonance, LC circuit 31 receives voltage signals in 1003 to control electro-optic positioner 26 to write micropatterns of data in 1004. Servo information may be obtained based on the center location of a current micropattern to adjust the position of the optical beam (via control signal 44, for example); however, this is not a requirement. Once the current micropattern has been completed, if there are remaining micropatterns to be written (1005), process 50 returns to 1001, where the optical beam is positioned to the center of a new micropattern. Thereafter, process 50 is repeated for the new micropattern.

A process for reading data from a micropattern on an optical medium includes substantially the same operations as process 50. Servo information, however, may be used more extensively in the reading process. For example, servo information could be obtained via a split optical beam (not shown) that senses low-quality read-back on inner or outer edges of a track of a micropattern. If low-quality read-back is sensed, the optical beam is adjusted accordingly based on a resulting feedback signal.

Figure 12:
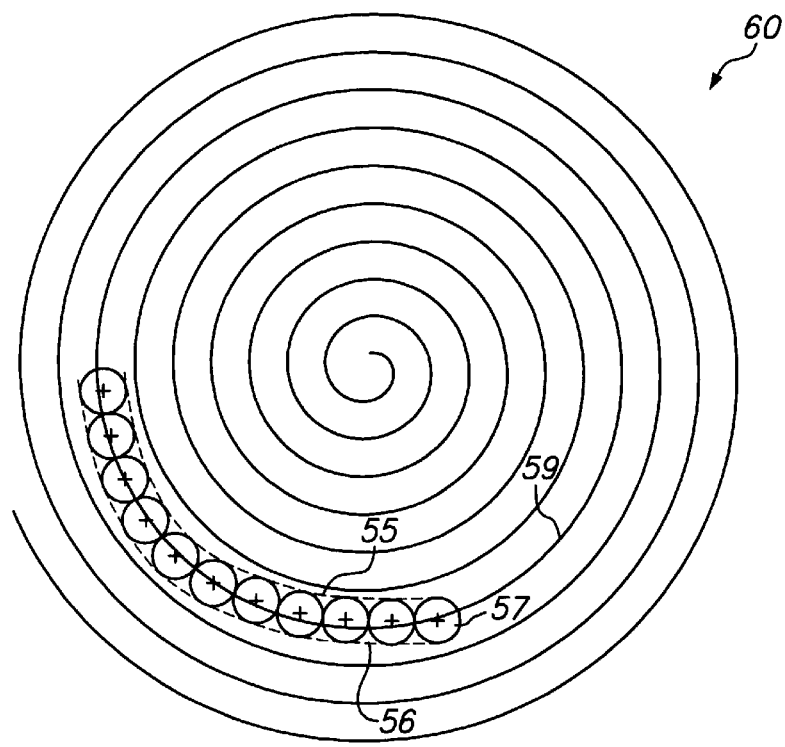
FIG. 12 is a top view of an optical beam scanning a micropattern in readback mode with micro-dithering for servo-feedback.

Alternatively, the high frequency response of electro-optic positioner 26 could be used to dither the optical beam on either side of the track of a micropattern in order to determine the location of the track. For example, as shown in FIG. 12, dithering an optical beam 57 along dotted lines 55 and 56 enables the center of the optical beam 57 to remain positioned over the track 59 of micropattern 60. This is analogous to a visually-impaired person tapping a cane to the left and right in order to stay on a sidewalk.

Figure 13:
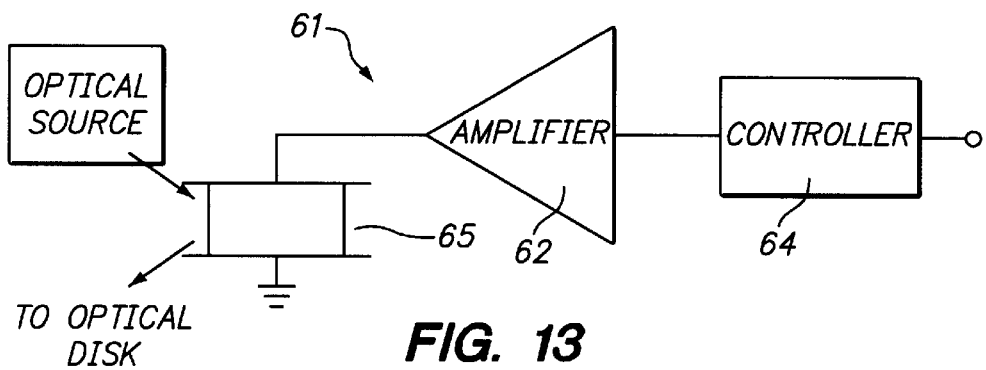
FIG. 13 is a circuit diagram showing an alternative optical positioning circuit for scanning an optical medium.
Figure 14:
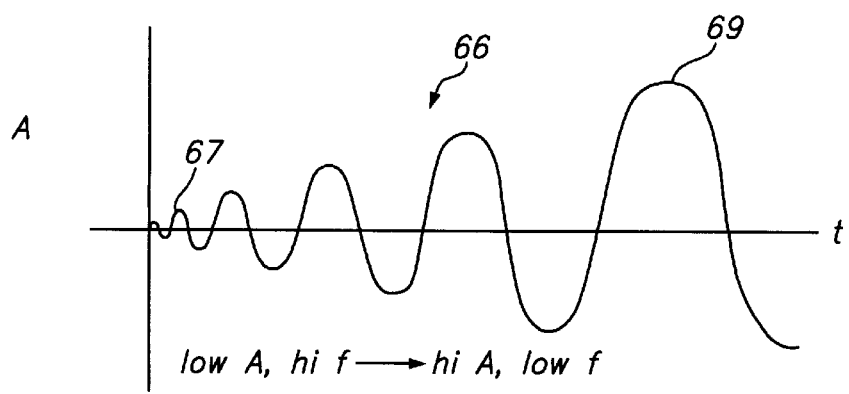
FIG. 14 shows a voltage signal that controls scanning of a non-resonant control source in the circuit of FIG. 13.

In an alternative embodiment 61 of the optical positioning circuit shown in FIG. 13, there is no LC circuit. Instead, voltage signals from controller 64 are provided to electro-optic positioner 65 via amplifier 62. A sinusoidal voltage signal with a progressively increasing amplitude and decreasing frequency, such as signal 66 shown in FIG. 14, can be applied to electro-optic positioner 65 in this case. The lower amplitude, higher frequency portions 67 of voltage signal 66 control formation (and reading) of the inner diameter portions of a micropattern. The higher amplitude, lower frequency portions 69 of voltage signal 66 control formation (and reading) of the outer diameter portions of the micropattern. As a result of these variations in frequency and amplitude, a substantially constant read/write data rate can be maintained throughout the micropattern. More generally, it is possible to vary the read/write rates along the micropattern by varying frequency and amplitude. The remaining features of circuit 61 are substantially identical to corresponding features of circuit 25.

As noted above, the invention can be used with any type of optical storage medium. For example, when storing data on an optical disk, such as a CD, control signal 44 (FIG. 9) is a linear ramp that tracks the rotation of the disk. In order not to require unduly low rotations-per-minute (RPMS) of the disk, micropatterns will not be written sequentially, but rather are interleaved on the disk.

A card storage device, such as a light plastic medium, is a rectangular sheet from which data is accessed within a "working region" of the electro-optic positioner. The size of the working region is limited by the maximum deflection angle range (in radians) of the electro-optic positioner times the focal length of its objective length. For example, a one centimeter focal length and a +/−10° (at +/−10 kV) deflection angle range results in a working area of about 0.03 cm$^2$ (0.16 cm×0.16 cm). A blue laser at 440 nm and an aperture of 0.8 gives a spot size of 0.33 $\mu$m. With magneto-optic recording, the bit spacing can be 0.13 $\mu$m (0.4 of the spot size) at a pitch of 0.4 $\mu$m. These figures result in a recording density of 1.9 gigabits/cm$^2$ (or 12.4 gigabits/in$^2$). Including a 10% unused portion between micropatterns results in a storage capacity of 215 megabits (or 27 megabytes) in the working region of the electro-optic positioner. It would therefore take 2 seconds to read/write data in a working region before the card storage device and/or the electro-optic positioner is mechanically re-positioned to a new working region (assuming that the data rate is 107 megabits per second).

Digital linear tape may remain motionless while micropatterns are read from/written to a portion of the tape. The micropatterns could be grouped together (e.g., 100 micropatterns per group) in hexagonal grid patterns that are in a. working region of the electro-optic positioner. A guard zone between blocks of micropatterns ensures the separation of blocks in the working region of the electro-optic positioner. The guard zone in this case may be on the order of 1 $\mu$m, for example.

Assuming that the electro-optic positioner has a working region that includes 2.15 megabits of data (with a 10% unused portion), reading and writing of each group of 100 micropatterns (14 mils by 14 mils, with each micropattern having a diameter of 1.6 mils) will take 22 ms at an average data rate of 100 megabits per second for one read/write optical beam (two optical beams could double this speed). If a guard zones of 0.5 mils is provided between groups, the amount of the tape that is utilized is 96.5%. Larger guard zones can reduce efficiency somewhat.

The invention is not limited to the specific embodiments described herein. The invention is not limited to use with the optical media described above. It can be used with any type of optical media. Similarly, the invention is not limited to use with the electro-optic positioner described above. Any electrically-controlled optical beam positioner can be used either alone, or in combination with, a conventional mechanical positioner.

What is claimed is:

1. A method of scanning a micropattern among micropatterns on an optical medium the micropatterns each comprising a microspiral and extending along less than a dimension along which the optical medium is moved, the method comprising:

positioning an optical beam at a location on the optical medium relative to the micropattern; and scanning the micropattern with the optical beam in accordance with a voltage signal.

2. A method of scanning a micropattern among micropatterns on an optical medium, the micropatterns each extending along less than a dimension along which the optical medium is moved, the method comprising:

positioning an optical beam at a location on the optical medium relative to the micropattern; and scanning the micropattern with the optical beam in accordance with a voltage signal, wherein the micropattern is less than 2 mils in diameter.

3. A method of scanning a micropattern among micropatterns on an optical medium, the micropatterns each extending along less than a dimension along which the optical medium is moved, the method comprising:

positioning an optical beam at a location on the optical medium relative to the micropattern; and scanning the micropattern with the optical beam in accordance with a voltage signal, wherein the scanning begins at a center of the micropattern.

4. A method of scanning a micropattern among micropatterns on an optical medium, the micropatterns each extending along less than a dimension along which the optical medium is moved, the method comprising:

positioning an optical beam at a location on the optical medium relative to the micropattern; and scanning the micropattern with the optical beam in accordance with a voltage signal, wherein the voltage signal has a substantially sinusoidal waveform with a progressively increasing amplitude and decreasing frequency, and higher frequency portions of the voltage signal control scanning inner diameter portions of the micropattern and lower frequency portions of the voltage signal control scanning outer diameter portions of the micropattern.

5. A method of scanning a micropattern among micropatterns on an optical medium, the micropatterns each extending along less than a dimension along which the optical medium is moved, the method comprising:

positioning an optical beam at a location on the optical medium relative to the micropattern;

scanning the micropattern with the optical beam in accordance with a voltage signal; and scanning additional micropatterns on the optical medium, wherein a guard zone is located a between and surrounds the micropatterns, the guard zone comprising an area of the optical medium which does not include data.

6. A method of scanning a micropattern among micropatterns on an optical medium, the micropatterns each extending along less than a dimension along which the optical medium is moved, the method comprising:

positioning an optical beam at a location on the optical medium relative to the micropattern;

scanning the micropattern with the optical beam in accordance with a voltage signal; and scanning additional micropatterns on the optical medium, wherein the micropattern and the additional micropatterns are arranged in a hexagonal grid pattern on the optical medium.

7. A method of scanning a micropattern among micropatterns on an optical medium, the micropatterns each extending along less than a dimension along which the optical medium is moved, the method comprising:

positioning an optical beam at a location on the optical medium relative to the micropattern;

scanning the micropattern with the optical beam in accordance with a voltage signal; and scanning additional micropatterns on the optical medium, wherein the micropattern and the additional micropatterns have essentially identical shapes, some of the additional micropatterns are connected to one another, and other of the additional micropatterns are not connected to any other micropatterns.

8. A method of scanning a micropattern among micropatterns on an optical medium, the micropatterns each extending along less than a dimension along which the optical medium is moved, the method comprising:

positioning an optical beam at a location on the optical medium relative to the micropattern; and scanning the micropattern with the optical beam in accordance with a voltage signal; and scanning additional micropatterns on the optical medium, wherein the micropattern and the additional micropatterns have substantially different shapes.

9. A method of scanning a micropattern among micropatterns on an optical medium, the micropatterns each extending along less than a dimension along which the optical medium is moved, 3 the method comprising:

positioning an optical beam at a location on the optical medium relative to the micropattern; and scanning the micropattern with the optical beam in accordance with a voltage signal; and scanning additional micropatterns on the optical medium, wherein the micropattern and the additional micropatterns are scanned in an interleaved rather than sequential manner.

10. A method of scanning a micropattern among micropatterns on an optical medium, the micropatterns each extending along less than a dimension along which the optical medium is moved, the method comprising:

positioning an optical beam at a location on the optical medium relative to the micropattern;

scanning the micropattern with the optical beam in accordance with a voltage signal; and providing the voltage signal to an electro-optic positioner via an inductive-capacitive circuit, wherein the electro-optic positioner performs the positioning and scanning.

11. A method of scanning a micropattern among micropatterns on an optical medium, the micropatterns each extending along less than a dimension along which the optical medium is moved, the method comprising:

positioning an optical beam at a location on the optical medium relative to the micropattern;

scanning the micropattern with the optical beam in accordance with a voltage signal; and providing the voltage signal to an electro-optic positioner that performs the positioning and scanning, wherein the electro-optic positioner comprises a capacitor having a dielectric which deflects the optical beam in accordance with the voltage signal.

12. A method of scanning a micropattern among micropatterns on an optical medium in order to read data from the optical medium, the micropatterns each comprising a microspiral and extending along less than $1/10^{th}$ a dimension along which the optical medium is moved, the method comprising:

positioning an optical beam at a location on the optical medium relative to the micropattern; and scanning the micropattern with the optical beam in accordance with a voltage signal.

13. A method of scanning a selected micropattern on an optical medium in order to read data from the optical medium during a read operation, wherein the selected micropattern is among micropatterns arranged in a hexagonal grid pattern on the optical medium, a guard zone between the micropatterns comprises at most 20% of the hexagonal grid pattern, no land and groove patterns are located in the hexagonal grid pattern, the micropatterns each comprise a microspiral, and the micropatterns each extend along less than $1/10^{th}$ a dimension along which the optical medium is moved during the read operation, the method comprising:

positioning an optical beam at a location on the optical medium relative to the selected micropattern; and scanning the selected micropattern with the optical beam in accordance with a voltage signal.

14. The method of claims 1, 2, 3, 4, 5, 6, 7, 8, 9, 10 or 11, wherein the micropattern extends along less than $1/10^{th}$ the dimension along which the optical medium is moved.

15. The method of claims 1, 2, 3, 4, 5, 6, 7, 8, 9, 10, 11, 12 or 13, wherein the micropattern is located on an area of the optical medium that does not include land and groove patterns.

16. The method of claims 1, 2, 3, 4, 5, 6, 7, 8, 9, 10, 11, 12 or 13, wherein the micropattern is less than 10×10 mils square in area.

17. The method of claims 2, 3, 4, 5, 6, 7, 8, 9, 10 or 11, wherein the micropattern comprises a microspiral.

18. The method of claims 2, 3, 4, 5, 6, 7, 8, 9, 10 or 11, wherein the micropattern comprises substantially concentric shapes.

19. The method of claims 1, 2, 3, 4, 5, 6, 7, 8, 9, 10, 11, 12, or 13, wherein the optical medium comprises one of a CD, digital linear tape, and a card storage medium.

20. The method of claims 1, 2, 3, 4, 5, 6, 7, 8, 9, 10, 11, 12, or 13, wherein the optical medium comprises a rotating disk.

21. The method of claims 1, 2, 3, 4, 5, 6, 7, 8, 9, 10 or 11, wherein the scanning includes writing a data pattern to the micropattern.

22. The method of claims 1, 2, 3, 4, 5, 6, 7, 8, 9, 10 or 11, wherein the scanning includes reading a data pattern from the micropattern.

23. The method of claims 1, 2, 3, 4, 5, 6, 7, 8, 9, 10, 11, 12, or 13, wherein the scanning includes dithering the optical beam on either side of a track of the micropattern in order to determine the location of the track.

24. The method of claims 1, 2, 3, 4, 5, 6, 7, 8, 9, 10, 11, 12, or 13, wherein the voltage signal has a substantially sinusoidal waveform with a progressively increasing amplitude and decreasing frequency.

25. The method of claim 5, wherein the guard zone comprises 20% or less of an area of the optical medium.

26. The method of claim 5, wherein the guard zone comprises 10% or less of an area of the optical medium.

27. The method of claim 6, wherein a guard zone is located between the micropatterns, the guard zone comprising an area of the optical medium which does not include data.

28. The method of claim 27, wherein the guard zone comprises 20% or less of an area of the optical medium.

29. The method of claims 1, 2, 3, 4, 5, 6, 7, 8, 9, 10, 11, 12, or 13, further comprising providing the voltage signal to an electro-optic positioner that performs the positioning and scanning.

30. The method of claim 10, wherein the inductive-capacitive circuit comprises an inductive winding of a transformer and a capacitor.

31. The method of claim 10, wherein the inductive-capacitive circuit is operable in a resonant mode for providing the voltage signal.

32. The method of claim 10, wherein the inductive-capacitive circuit increases the voltage from a voltage source.

33. The method of claim 11, wherein the capacitor comprises a dielectric prism having an index of refraction that varies in accordance with the voltage signal to cause directional changes in the optical beam.

34. The method of claims 1, 12 or 13, wherein the micropattern consists essentially of the microspiral.

35. The method of claims 1, 12 or 13, wherein the micropattern consists of the microspiral.

36. The method of claims 2, 3, 4, 5, 6, 7, 8, 9, 10 or 11, wherein the micropattern consists essentially of a microspiral.

37. The method of claims 2, 3, 4, 5, 6, 7, 8, 9, 10 or 11, wherein the micropattern consists of a microspiral.

38. The method of claims 1, 2, 3, 4, 5, 6, 7, 8, 9, 10, 11, 12, or 13, wherein the optical medium is devoid of synthetic DNA polymers.

* * * * *